(12) United States Patent
Cheon et al.

(10) Patent No.: US 10,171,278 B2
(45) Date of Patent: Jan. 1, 2019

(54) METHODS AND APPARATUS FOR FREQUENCY OFFSET ESTIMATION

(71) Applicants: Hyun Soo Cheon, San Jose, CA (US); Hong Jik Kim, San Jose, CA (US); Tejas M. Bhatt, Sunnyvale, CA (US)

(72) Inventors: Hyun Soo Cheon, San Jose, CA (US); Hong Jik Kim, San Jose, CA (US); Tejas M. Bhatt, Sunnyvale, CA (US)

(73) Assignee: CAVIUM, LLC, Santa Clara, CA (US)

( * ) Notice: Subject to any disclaimer, the term of this patent is extended or adjusted under 35 U.S.C. 154(b) by 0 days.

(21) Appl. No.: 15/592,087

(22) Filed: May 10, 2017

(65) Prior Publication Data

US 2017/0331664 A1 Nov. 16, 2017

Related U.S. Application Data

(60) Provisional application No. 62/335,366, filed on May 12, 2016.

(51) Int. Cl.
*H04L 27/26* (2006.01)

(52) U.S. Cl.
CPC ...... *H04L 27/2678* (2013.01); *H04L 27/2657* (2013.01); *H04L 27/2675* (2013.01); *H04L 27/2636* (2013.01)

(58) Field of Classification Search
CPC ............ H04L 27/2675; H04L 27/2678; H04L 27/266; H04L 27/2662; H04L 27/2659; H04L 27/2607; H04L 27/2601; H04L 27/2649
USPC ............... 375/260, 316, 344, 346, 362, 340; 455/296, 139
See application file for complete search history.

(56) References Cited

U.S. PATENT DOCUMENTS

| 2004/0129784 A1* | 7/2004 | Iwaguchi | G06K 7/14 235/462.16 |
| 2008/0089450 A1* | 4/2008 | Zelst | H04L 27/0014 375/344 |
| 2008/0232516 A1* | 9/2008 | Cheng | H04L 5/023 375/344 |

(Continued)

FOREIGN PATENT DOCUMENTS

WO   WO 2015023220   * 2/2015

*Primary Examiner* — Leila Malek
(74) *Attorney, Agent, or Firm* — James M. Wu; JW Law Group

(57) ABSTRACT

Methods and apparatus for frequency offset estimation are disclosed. In an exemplary embodiment, a method includes determining a demodulation reference signal (DMRS) frequency offset estimate from DMRS symbols in a received signal, and determining a cyclic prefix (CP) frequency offset estimate from cyclic prefix values in the received signal. The method also includes combining the DMRS and CP frequency offset estimates to determine a final frequency offset estimate. In an exemplary embodiment, an apparatus includes a DMRS frequency offset estimator that determines a DMRS frequency offset estimate based on DMRS symbols received in an uplink transmission, and a cyclic prefix (CP) frequency offset estimator that determines a CP frequency offset estimate based on cyclic prefix values in the uplink transmission. The apparatus also includes an offset combiner that combines the DMRS frequency offset estimate with the CP frequency offset estimate to generate a final frequency offset estimate.

19 Claims, 5 Drawing Sheets

(56) References Cited

U.S. PATENT DOCUMENTS

| | | | |
|---|---|---|---|
| 2008/0273641 A1* | 11/2008 | Yang | H04L 5/023 375/359 |
| 2010/0118990 A1* | 5/2010 | Lee | H04L 27/2656 375/260 |
| 2016/0197712 A1* | 7/2016 | Sorrentino | H04L 5/0051 370/336 |

* cited by examiner

METHODS AND APPARATUS FOR FREQUENCY OFFSET ESTIMATION

CLAIM TO PRIORITY

This application claims the benefit of priority based upon U.S. Provisional Patent Application having Application No. 62/335,366, filed on May 12, 2016, and entitled "FREQUENCY OFFSET ESTIMATOR," which is hereby incorporated herein by reference in its entirety.

FIELD

The exemplary embodiments of the present invention relate to telecommunications networks. More specifically, the exemplary embodiments of the present invention relate to receiving and processing data streams via a wireless communication network.

BACKGROUND

With a rapidly growing trend of mobile and remote data access over high-speed communication networks, such as provided by long term evolution (LTE) cellular networks, accurate delivery and deciphering of data streams has become increasingly challenging and difficult. For example, in a multi-user LTE system, the frequency offset associated each user is independent of the other users. Frequency offset causes clockwise or counter clockwise incremental phase rotation of the received signal samples. The current LTE standard constrains the frequency offset that can be estimated to a range of (−1 kHz to 1 kHz). However, performance requirements specified in the LTE specification forces baseband system manufacturers to extend the frequency offset estimation range. For example, to provide communications to users riding on high speed trains, expanding the frequency offset estimation to a range that covers (−1.7 kHz to 1.7 kHz) may be necessary.

Therefore, it is desirable to have a mechanism for frequency offset estimation that can accurately estimate a wider range of frequency offset to satisfy high speed performance requirements of wireless communication systems.

SUMMARY

The following summary illustrates simplified versions of one or more aspects of present invention. The purpose of this summary is to present some concepts in a simplified description as more detailed description that will be presented later.

Methods and apparatus for frequency offset estimation are disclosed. For example, the frequency offset estimation for use in an LTE uplink can be performed. The exemplary embodiments of the frequency offset estimation support frequency offset estimation with 15 times wider range than the conventional schemes. The exemplary embodiments of the frequency offset estimation utilize joint frequency offset estimation that comprises both fine and coarse frequency offset estimation. The exemplary embodiments of the frequency offset estimation can be implemented with a single pipeline and the frequency offset can be estimated up to subcarrier level (smallest element of the FFT output).

The exemplary embodiments of the frequency offset estimation can use the user allocation information in layer 2 (MAC layer), such that the estimation accuracy can be improved through the average of the estimate of each sub-frame.

The exemplary embodiments of the frequency offset estimation can be applied to LTE uplink MIMO cases where the cyclic prefix is not completely orthogonal to the other part of a symbol by including the normal data part to keep the orthogonality.

In an exemplary embodiment, a method is provided that includes determining a demodulation reference signal (DMRS) frequency offset estimate from DMRS symbols in a received signal, and determining a cyclic prefix (CP) frequency offset estimate from cyclic prefix values in the received signal. The method also includes combining the DMRS and CP frequency offset estimates to determine a final frequency offset estimate.

In an exemplary embodiment, an apparatus is provided that includes a DMRS frequency offset estimator that determines a DMRS frequency offset estimate based on DMRS symbols received in an uplink transmission, and a cyclic prefix (CP) frequency offset estimator that determines a CP frequency offset estimate based on cyclic prefix values in the uplink transmission, The apparatus also includes an offset combiner that combines the DMRS frequency offset estimate with the CP frequency offset estimate to generate a final frequency offset estimate.

Additional features and benefits of the exemplary embodiments) of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
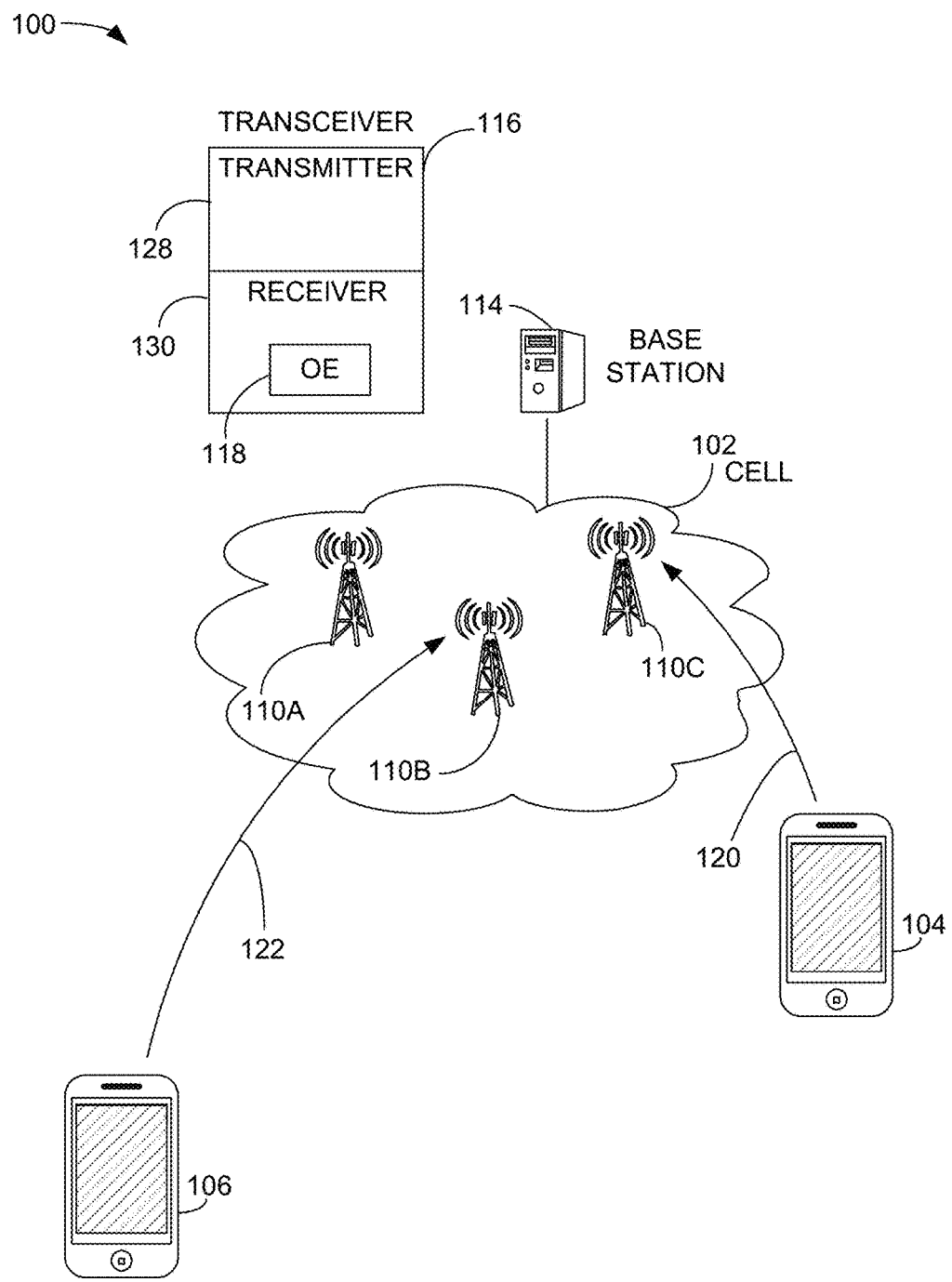
FIG. 1 shows a communication network comprising a transceiver having an exemplary embodiment of a frequency offset estimator (OE) configured to accurately measure frequency offset associated with uplink communications from a plurality of users.

Aspects of the present invention are described herein the context of methods and apparatus for frequency offset estimation.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In various exemplary embodiments, the disclosed methods and apparatus provide one or more of the following novel aspects.

A. Frequency offset estimation using the cyclic prefix.

B. Frequency offset estimation in frequency domain by measuring the phase difference of two FFT outputs generated with two input samples captured at normal and adjustable time offset.

C. Phase difference measurement between a normal FFT output of an LTE uplink symbol and an FFT output of a cyclic-time shifted. LTE uplink symbol, which is captured with an adjustable sample offset, which injects timing offset.

D. The complex metrics for phase difference estimation are cross-correlation results (a product of complex values of each subcarrier), and they are averaged for each resource block (RB) as a basic unit. The unit (RB-wise) metrics are combined across the RBs for each user depending on uplink scheduling, and across several time slots (TTI) for better accuracy.

FIG. 1 shows a communication network 100 comprising a transceiver 116 having an exemplary embodiment of a frequency offset estimator (OE) 118 configured to accurately measure frequency offset associated with uplink communications from a plurality of users. The communication network 100 includes a base station 114 that includes the transceiver 116. The transceiver 116 has a transmitter portion 128 and a receiver portion 130. The base station 114 communicates with radio towers 110 located in cell site 102.

User equipment (UE) 104 transmits uplink communications 120 to the base station 114 through tower 110c, and user equipment 106 transmits uplink communications 122 to the base station 114 through tower 110b. For example, the UEs can be cellular phones, handheld devices, tablet computers or iPad® devices. It should be noted that the underlying concepts of the exemplary embodiments of the present invention would not change if one or more devices were added or removed from the communication network 100.

Each user equipment transmits its signal through an associated uplink channel. The transmitted uplink signal suffers from frequency offset due to Doppler shift and mismatch between oscillators in the transmitter of the UE and the receiver in the base station. Each user's frequency offset can be assumed to be independent from other users, since each user has its own oscillator and its motion and speed are independent from other users.

To improve data reception for the uplink communications, the receiver 130 includes the frequency offset estimator 118. The frequency offset estimator 118 operates to estimate the frequency offset associated with each of the users 104 and 106. In an exemplary embodiment, the OE 118 estimates the frequency offset with a wide range (e.g., −1.7 kHz to 1.7 kHz), which enables accurate data reception on the uplink communications even when the users 104 and 106 are traveling at a high rate of speed. For example, a user may be riding on a high-speed train traveling at speeds approaching or exceeding 300 mph and the OE 118 will still be able to determine an accurate frequency offset. A more detailed description of the OE 118 is provided below.

Figure 2:
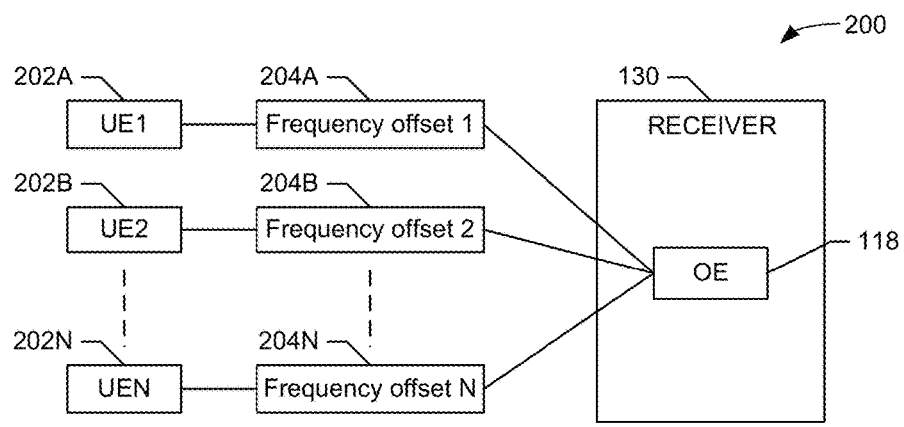
FIG. 2 shows an exemplary functional block diagram of the communication network shown in FIG. 1.

FIG. 2 shows an exemplary functional block diagram 200 of the communication network 100 shown in FIG. 1. Each user equipment (202) transmits its signal through an uplink transmission to the receiver 130. The transmitted signals suffer from associated frequency offset (204) due to Doppler shift and mismatches between oscillators in the user equipment (transmitters) and oscillators in the receiver 130 (base station). Each user's frequency offset can be assumed to be independent since each user has its own oscillator and is moving at a speed that is independent of the other users. In various exemplary embodiments, the frequency offset estimator 118 operates to estimate the frequency offset of each of the user with a wide range (e.g., −1.7 kHz to 1.7 kHz), which enables accurate data reception of the uplink transmission even when a user is traveling at a high rate of speed.

Figure 3:
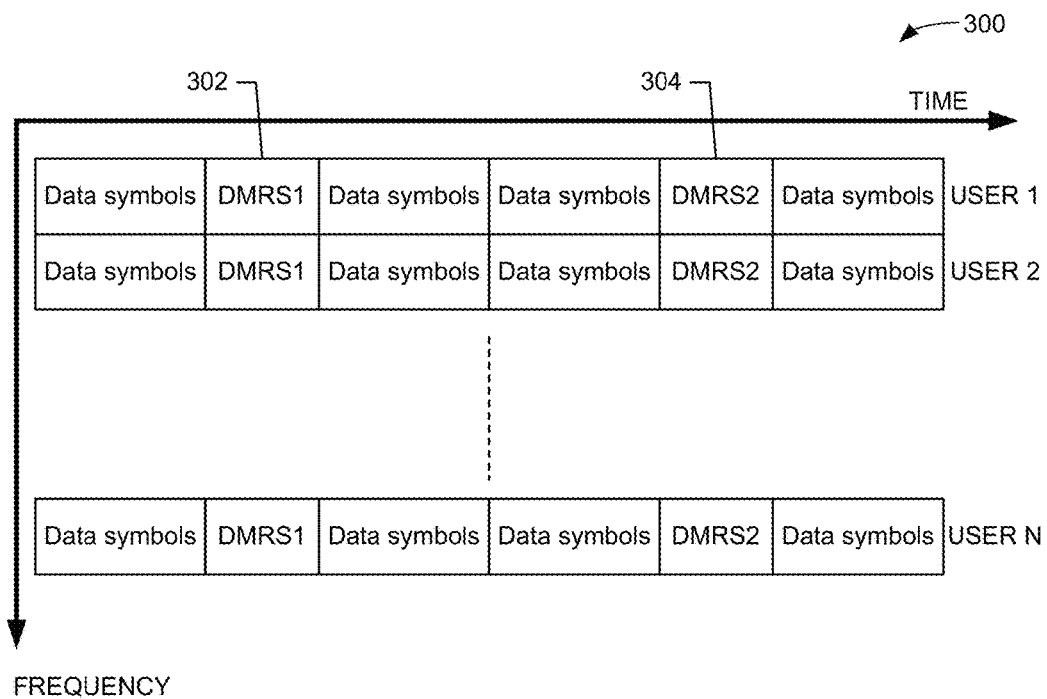
FIG. 3 shows an exemplary diagram of data symbols received at a receiver in uplink transmissions from a plurality of users.

FIG. 3 shows an exemplary diagram of data symbols 300 received at a receiver in uplink transmissions from a plurality of users. For example, the symbols 300 may be received by the receiver 130 shown in FIG. 2. With respect to an LTE uplink transmission, each user's signal is configured as SC-FDMA (single carrier—frequency division multiple access), which is multiplexed in the frequency domain with other users. Each users' uplink transmission includes two DMRS (demodulation reference signal) symbols (302, 304) per a sub-frame, where a sub-frame is the minimum transmission unit in LTE.

The DMRS symbols work as pilot symbols, which enable channel estimation and frequency offset estimation. When they are used for frequency offset estimation, the phase difference between two channel responses estimated with them is measured. If the measured phase shift is φ, the frequency offset can be calculated as:

$$f_{offset} = (\phi / 2\pi T)$$

where T is time distance between the two DMRS, which is 0.5 ms in LTE systems. Thus, the estimation range is limited to (−1 kHz, 1 kHz), since it is difficult to distinguish the phase difference beyond the range of (−π to π).

Figure 4:
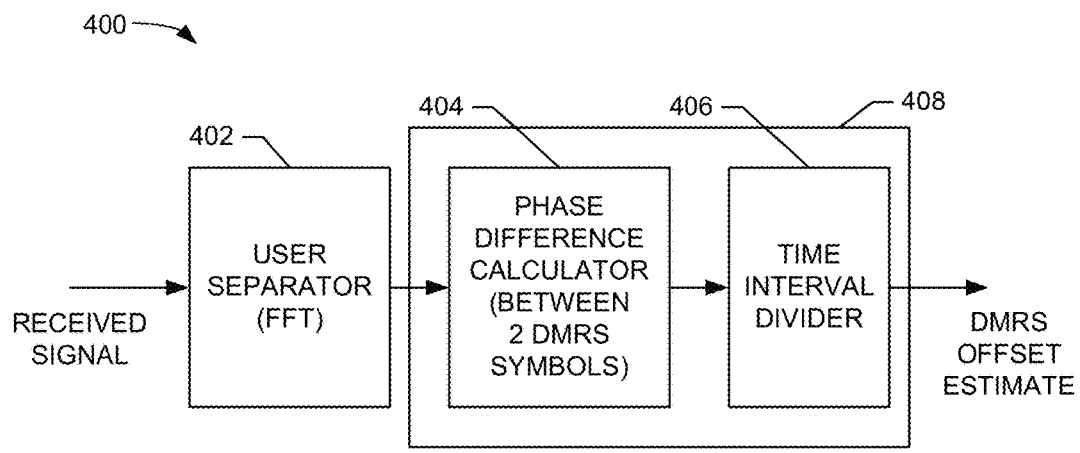
FIG. 4 shows an exemplary embodiment of a DMRS frequency offset estimator for use in an exemplary embodiment of the frequency offset estimator shown in FIGS. 1-2.

FIG. 4 shows an exemplary embodiment of a DMRS frequency offset estimator 408 for use in an exemplary embodiment of the frequency offset estimator 118 shown in FIGS. 1-2. In an exemplary embodiment, the estimator 408 comprises a digital signal processor (DSP). A received signal is input to user separator 402, which performs an (FFT) to separate out frequencies associated with a particular user. For example, since the LTE uplink uses SC-FDMA (single carrier—frequency domain multiple access) scheme to multiplex multi-user signals in frequency division manner, the receiver 130 operates to measure the frequency offset of each user by separating each user signal in the frequency domain. The output of the separator 402 is input to the DMRS frequency offset estimator 408, which comprises a phase difference calculator 404 and a time interval divider 406.

In an exemplary embodiment, the phase difference calculator 404 comprises at least one of a CPU, processor, state machine, logic, memory, discrete hardware and/or any combination thereof. The phase difference calculator 404 calculates a phase different between two DMRS symbols in a received sub-frame for a particular user. For example, as illustrated in FIG. 3, the phase difference calculator 404 calculates the phase shift φ between DMRS symbols 302 and 304.

In an exemplary embodiment, the time interval divider 406 comprises at least one of a CPU, processor, state machine, logic, memory, discrete hardware and/or any combination thereof. The time interval divider 406 divides the calculated phase shift φ by the time interval (T) between the DMRS symbols (e.g., symbols 302 and 304) to determine a DMRS frequency offset estimate. If the measured phase shift is φ, the DMRS frequency offset can be calculated as:

$f_{offset} = (\phi/2\pi T)$ where T is time distance between the two DMRS, hick, for example, is 0.5 milliseconds (ms) in LTE systems.

Figure 5:
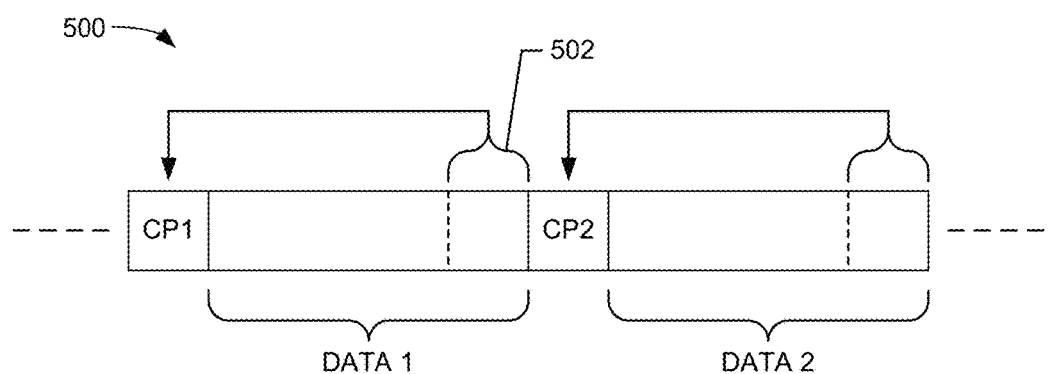
FIG. 5 shows an exemplary embodiment of a user data stream that includes data values having a cyclic prefix.

FIG. 5 shows an exemplary embodiment of a user data stream 500 that includes data values having a cyclic prefix. In an exemplary embodiment, the DATA1 symbol has a cyclic prefix (CP1) that is a copy of the data 502 at the end of the DATA1 symbol. The data 502 is copied and then placed in front to prefix the symbol with a repetition of the data at the end of the symbol. The cyclic prefix serves two purposes. First, as a guard interval, it eliminates the inter-symbol interference from the previous symbol. Second, as a repetition of the end of the symbol, it allows a linear convolution of a frequency-selective multipath channel to be modelled as a circular convolution, which in turn may be transformed to the frequency domain using a discrete Fourier transform. This approach allows for simple frequency-domain processing, such as channel estimation and equalization. Typically, the length of the cyclic prefix must be at least equal to the length of the multipath channel.

In an exemplary embodiment, to widen the frequency offset measurement range of the OE 118 and to support the frequency offset estimation for multiple users in the LTE uplink, the cyclic prefix is exploited during the frequency offset estimation. For example, in an exemplary embodiment, the contribution of the cyclic prefix to the frequency offset estimation is separated in the frequency domain and selectively applied.

Figure 6:
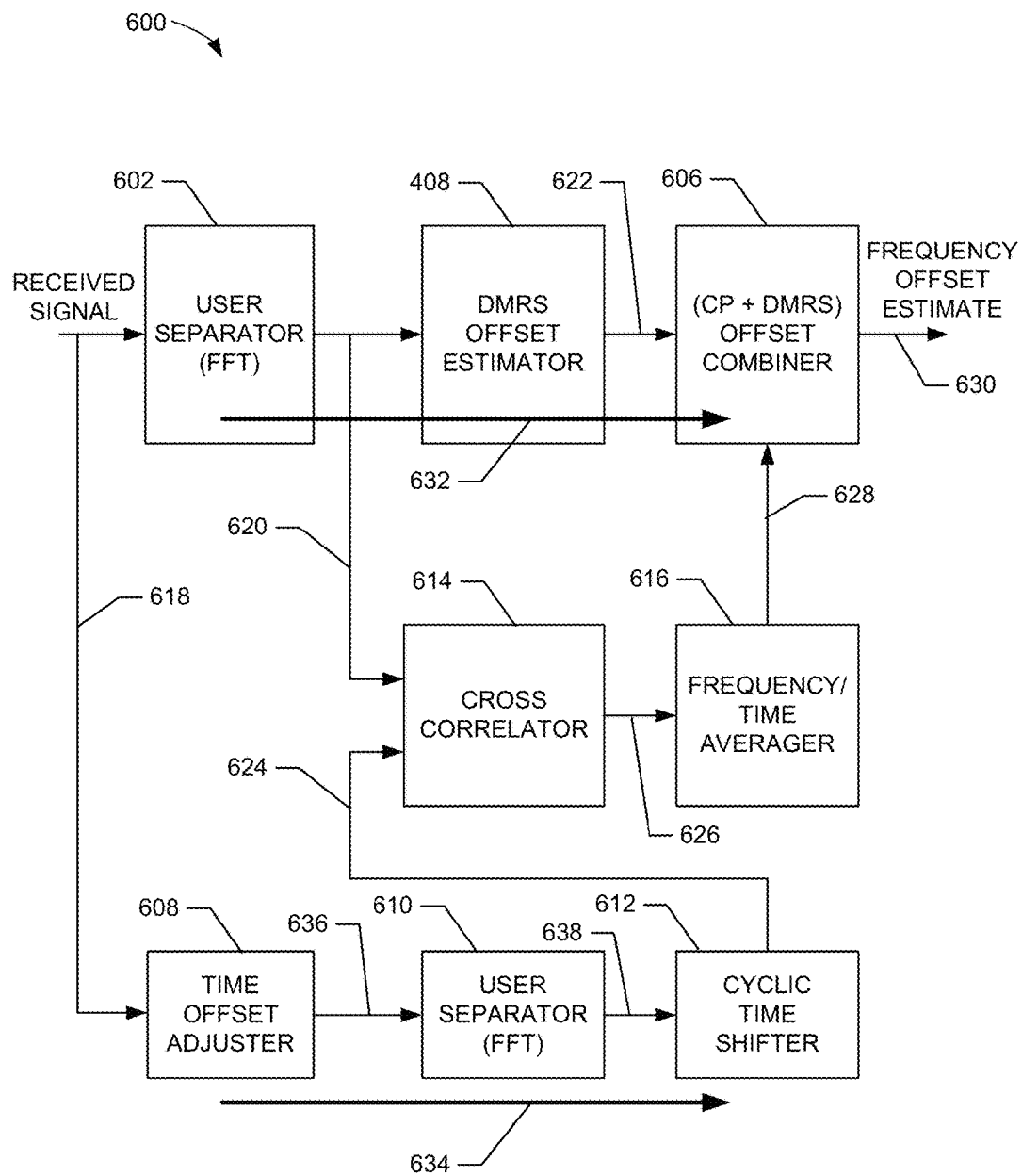
FIG. 6 shows an exemplary embodiment of a frequency offset estimator constructed in accordance with the present invention.

FIG. 6 shows an exemplary embodiment of a frequency offset estimator 600 constructed in accordance with the present invention. For example, the frequency offset estimator 600 is suitable for use as the frequency offset estimator 118 shown in FIGS. 1-2. The frequency offset estimator 600 comprises user separator 602, DMRS frequency offset estimator 408, offset combiner 606, time offset adjuster 608, user separator 610, cyclic time shifter 612, cross correlator 614 and frequency/time averager 616.

In an exemplary embodiment, the frequency offset estimator 600 estimates the frequency offset of each user by estimating a first frequency offset using two received DMRS (pilot) symbols and by estimating a second frequency offset using cyclic prefixes. The two frequency offsets are combined to form a final frequency offset estimation with much wider range than conventional offset detectors. A first processing path 632 is used to estimate the first frequency offset for a particular user using DMRS symbols for the frequency offset estimation. A second processing path 634 is used to estimate the second frequency offset for the particular user using cyclic prefixes. The offset combiner 606 operates to combine the first and second frequency offsets to produce a final frequency offset estimate 630 for the particular user with a wide range of up to (−15 kHz to 15 kHz).

In an exemplary embodiment, the user separator 602 comprises at least one of a CPU, processor, state machine, logic, memory, discrete hardware and/or any combination thereof to perform user separation in LTE uplink. For example, since the uplink signals are frequency-domain multiplexed signals, each user's signal can be separated by its own transmitted frequency. In an exemplary embodiment, the separator 602 performs an FFT on the received signal 618 to separate frequency components associated with a particular user.

In an exemplary embodiment, the DMRS frequency offset estimator 408 operates as described with reference to FIG. 4. For example, the estimator 408 measures the phase difference between two DMRS symbols and estimates a fine frequency offset in the range of (−1 kHz to 1 kHz). The output of the estimator 408 is a first frequency offset estimate 622 that is input to the offset combiner 606.

In an exemplary embodiment, the time offset adjuster 608 comprises at least one of a CPU, processor, state machine, logic, memory, discrete hardware and/or any combination thereof and time adjustments the received symbols 618 to take the cyclic prefix portion of the transmitted symbols and to provide this cyclic prefix portion as an input to the user separator 610. For example, in the transmitter (user equipment), the cyclic prefix is copied from the tail of each SC-FDMA symbol to the front of each symbol, so that the front and tail portion of the symbol are identical. Thus, in the receiver side (base station), both parts can be used for frequency offset estimation for each user. The cyclic prefix portion 636 is input to the user separator 610.

In an exemplary embodiment, the user separator 610 comprises at least one of a CPU, processor, state machine, logic, memory, discrete hardware and/or any combination thereof to perform user separation in LTE uplink communications. For example, since the uplink signals are frequency-domain multiplexed signals, each user's signal can be separated by its own transmitted frequency. In an exemplary embodiment, the separator 602 performs an FFT on the cyclic prefix input 636 to separate frequency components 638 of the cyclic prefix associated with the same user whose signal was separated out by the user separator 602.

In an exemplary embodiment, the cyclic time shifter 612 comprises at least one of a CPU, processor, state machine, logic, memory, discrete hardware and/or any combination thereof to perform cyclic time shifting of the FFT output (frequency components 638) from the user separator 610. To equalize the time alignment of time domain symbols for two offset detection paths, cyclic time shifting is performed. This can be done in time (before FFT) or frequency (after FFT). In an exemplary embodiment, the cyclic time shifting is performed by applying complex sinusoid samples to the FFT output (components 638), which results in cyclic time shifting of its time domain sequences (cyclic prefix input 636). This block rotates the FFT output 624 to be aligned identically with FFT output 620 in the first processing path 632.

In an exemplary embodiment, the cross correlator 614 comprises at least one of a CPU, processor, state machine, logic, memory, discrete hardware and/or any combination thereof to cross correlate two inputs (the FFT output sequences 620 and 624) from the first processing path 632 and the second processing path 634, so that the correlated output 626 contains a complex number which can be accumulated over several symbol durations (which is configurable) and contains a phase difference in its phase angle. According to the frequency portion of each user, complex multiplication results of two FFT outputs are summed or averaged for the frequency offset estimation of multiple users.

In an exemplary embodiment, the frequency/time average 616 comprises at least one of a CPU, processor, state machine, logic, memory, discrete hardware and/or any combination thereof to take an average of each of the frequency elements of the output 626 from the correlator 614 over some time duration, to lower the impact of the receiver noise on the phase difference which is measured through cross correlation.

Therefore, by cross-correlating the two FFT outputs (non-cyclic time shifted and cyclic time shifted) one by one, the phase difference of each element of the FFT output can be obtained, since there are two different tail parts when the frequency offset is not zero. During the cross-correlation, the normal data portion can be skipped, since the normal data portion is identical in both signal paths.

In an exemplary embodiment, the frequency offset combiner 606 comprises at least one of a CPU, processor, state machine, logic, memory, discrete hardware and/or any combination thereof. The combiner 606 operates to receive the DMRS frequency offset estimate 622 from frequency offset estimator 408, which represents a fine frequency offset (ϕfine), and the averaged cross-correlation result 628, which represents a coarse frequency offset (ϕcoarse) determined by the cyclic prefix and its original part (tail of a normal symbol). The latter is for estimating the integer part of the phase difference, which is a "coarse frequency offset estimate." The combining results in a total phase difference ϕtotal that can be written as:

$$\Phi_{total} = \Phi_{fine} + \Phi_{coarse} = \Phi_{fine} + 2n_{coarse}\pi$$

where $n_{coarse}$ is an integer from the coarse estimate of the frequency offset using the output from the second processing path 634 and can be obtained from:

$$n_{coarse} = \text{round}[(\Phi_{coarse}/(2\pi T_{symb}/T_{dmrs}))]$$

where $T_{symb}$ a symbol duration (1/15 kHz), and $T_{dmrs}$ is a time distance between two DMRS symbols (0.5 ms).

In an exemplary embodiment, the first processing path 632 is used for fine frequency offset in the range of (−1 kHz, 1 kHz), and the second processing path 634 is used for coarse frequency offset in the range of (15 kHz, 15 kHz).

Techniques to Determine Coarse Offset

Determining the coarse offset with regards to the use of the normal data part of the symbol, two schemes are presented. In a first scheme, if the normal data part of the symbol is included in the cross-correlation performed by block 614, the follow result is produced:

$$X_{corr0} = A + B e^{j\Phi_{coarse}}$$

where A is a real constant obtained from the normal data part, and $\Phi_{coarse}$ is a phase difference between the cyclic prefix and tail part of each symbol. Thus, the coarse frequency offset can be estimated as follows:

$$\Phi_{coarse} = \text{angle}(X_{corr0} - A)$$

where A can be simply estimated by measuring the power of an SC-FDMA symbol.

In a second scheme, to eliminate the impact of A, the normal data part can be skipped when cross-correlating at block 614, which results in the following:

$$X_{corr1} = B e^{j\Phi_{coarse}}$$

The coarse phase difference then can be calculated simply as:

$$\Phi_{coarse} = \text{angle}(X_{corr1})$$

It should be noted, however, in some cases in LTE uplink MIMO, some DMRS symbols are not orthogonal to other parts of the symbol, so in that case the first technique may yield better performance.

Figure 7:
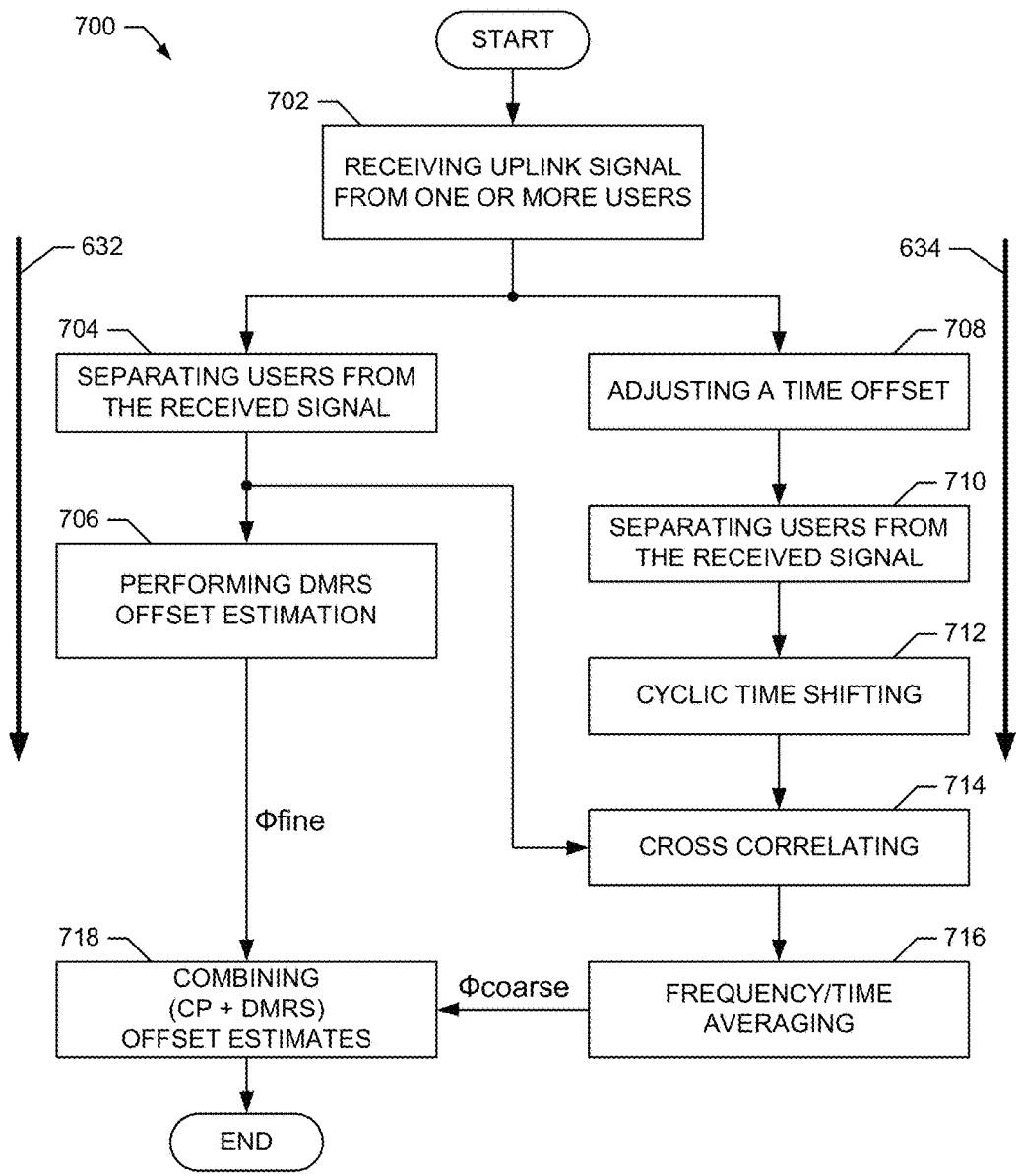
FIG. 7 shows an exemplary method for performing frequency offset estimation in a receiver in accordance the present invention.

FIG. 7 shows a method 700 for performing frequency offset estimation in a receiver in accordance with an exemplary embodiment of the present invention. For example, in an exemplary embodiment, the method 700 is suitable for use by the OE 600 shown in FIG. 6.

At block 702, an uplink signal is received at a receiver from one or more users. For example, the uplink signal 618 comprises uplink transmissions from one or more users in an LTE communication network.

At block 704, at the start of the first processing path 632, a particular user transmissions are separated from the received signal. In an exemplary embodiment, the user separator 602 performs this operation by performing an (FFT) to separate frequency components transmitted by the particular user and outputting these components.

At block 706, a DMRS frequency offset estimation is performed on the frequency components for the selected user. For example, the DMRS frequency offset estimator 408 operates to receive the user frequency components and perform frequency offset estimation using the DMRS symbols in the received transmissions. A more detailed description of the DMRS frequency offset estimator 408 is provided above with reference to FIG. 4. In an exemplary embodiment, the time interval divider 406 divides the calculated phase shift ϕ by the time interval (T) between the DMRS symbols (e.g., symbols 302 and 304) to determine a DMRS frequency offset estimate. If the measured phase shift is ϕ, the DMRS frequency offset can be calculated as:

$$f_{offset} = (\phi/2\pi T)$$

where T is time distance between the two DMRS, which, for example, is 0.5 milliseconds (ms) in LTE systems. The DMRS frequency offset estimate represents a fine frequency offset and is output to block 718.

At block 708, at the start of a second processing path 634, a time offset of the received signal is adjusted. In an exemplary embodiment, the time offset adjuster 608 adjusts a time offset of the received signal. The received signal with an adjusted time offset is then output.

At block 710, user transmissions are separated from the time adjusted received signal. In an exemplary embodiment, the user separator 610 performs this operation by performing an (FFT) to separate frequency components transmitted by the selected user (see block 704) and outputting these components.

At block 712, a cyclic time shift is performed on the separated time adjusted user transmissions. Since two input signal samples for the two offset estimation paths are not time aligned, this time offset difference is compensated by cyclic time shifting. This can be done before or after the FFT process. In an exemplary embodiment, the cyclic time shifter 612 performs this operation.

At block 714, a cross-correlation is performed on the output of block 704 and the output of block 712. For example, in an exemplary embodiment, the cross-correlator 614 performs a cross correlation on the user frequency components 620 derived from the received signal and the cyclic shifted frequency components 624. For example, after an FFT converts the received signal samples (in time domain) to frequency domain samples in each offset estimation path, the resulting samples from the two paths are cross-correlated (1-to-1 complex multiplication) to compute the phase difference between them.

At block 716, frequency/time averaging is performed. In an exemplary embodiment, the frequency/time average 616 performs this operation by averaging together multiple correlation outputs over time. The averaged value is output as cyclic prefix (CP) frequency offset estimate 628. For example, the cross-correlation results for the entire uplink frequency bands are summed or averaged selectively over the subcarrier range that has been scheduled for each uplink user. The uplink scheduling is being done in the receiver side, and this scheduling information is already known to the receiver. Those values are also accumulated or averaged over the selected symbols in each user's transmitting duration.

At block 718, an operation of combining is performed to combine the DMRS frequency offset estimate (fine offset) ith the CP frequency offset estimate (coarse offset). In an exemplary embodiment, the offset combiner 606 performs this operation. The output of the combining operation is a final frequency offset estimate with 15 times wider range than frequency offset estimates using only the DMRS symbols.

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method, comprising:
   determining a demodulation reference signal (DMRS) frequency offset estimate from DMRS symbols in a received signal;
   determining a cyclic prefix (CP) frequency offset estimate from cyclic prefix values associated with symbols received in the received signal, wherein the determining the CP frequency offset estimate includes adjusting a time offset of the received signal and separating a selected user's uplink transmission from the time adjusted received signal to generate a separated signal; and
   combining the DMRS and CP frequency offset estimates to determine a final frequency offset estimate.

2. The method of claim 1, wherein the operation of determining the DMRS frequency offset estimate comprises separating a selected user's uplink transmission associated with the DMRS symbols from the received signal.

3. The method of claim 2, wherein the operation of determining the DMRS frequency offset estimate comprises calculating a phase difference $\phi$ between two DMRS symbols.

4. The method of claim 3, wherein the operation of determining the DMRS frequency offset estimate comprises dividing the phase difference $\phi$ by a selected time interval T to determine the DMRS frequency offset estimate.

5. The method of claim 4, wherein the operation of determining the DMRS frequency offset estimate comprises calculating the DMRS frequency offset estimate from an equation expressed as $f_{offset}=(\phi/2\pi T)$.

6. The method of claim 1, wherein the operation of determining the CP frequency offset estimate comprises cyclic time shifting the separated signal to generate a cyclic time shifted signal.

7. The method of claim 6, wherein the operation of determining the CP frequency offset estimate comprises cross-correlating a selected user's uplink transmission associated with the DMRS symbols and the cyclic time shifted signal to generate a correlated signal.

8. The method of claim 7, wherein the operation of determining the CP frequency offset estimate comprises frequency time averaging the correlated signal to generate the CP frequency offset estimate.

9. The method of claim 8, wherein the operation of combining comprises combining the DMRS frequency offset estimate ($\Phi$fine) with the CP frequency offset estimate ($\Phi$coarse) to determine a total phase difference $\Phi$total from an equation expressed as: $\Phi$total=fine+$\Phi$coarse.

10. The method of claim 9, further comprising an operation of determining $\Phi$coarse from an equation expressed as (2*ncoarse*$\pi$) where ncoarse=round [$\Phi$coarse/(2$\pi$Tsymb/Tdmrs)], and where Tsymb is a symbol duration and Tdmrs is a time distance between two DMRS symbols.

11. The method of claim 10, further comprising an operation of receiving the received signal in a long term evolution ("LTE") uplink transmission.

12. An apparatus, comprising:
   a demodulation reference signal (DMRS) frequency offset estimator that determines a DMRS frequency offset estimate based on DMRS symbols received in an uplink transmission, wherein the DMRS frequency offset estimator is configured to calculate a phase difference $\Phi$ between two DMRS symbols and divide the phase difference by a selected time interval T to determine the DMRS frequency offset estimate from an equation expressed as $f_{offset}=(\Phi/2\pi T)$;
   a cyclic prefix (CP) frequency offset estimator that determines a CP frequency offset estimate based on cyclic prefix values associated with symbols in the uplink transmission, wherein the CP frequency offset estimator is configured to adjust a time offset of the received signal to generate a time adjusted signal and separates an uplink user transmission from the time adjusted signal; and
   an offset combiner that combines the DMRS frequency offset estimate with the CP frequency offset estimate to generate a final frequency offset estimate.

13. The apparatus of claim 12, wherein the CP frequency offset estimator cyclic time shifts the uplink user transmission to generated a time shifted signal, and cross-correlates the time shifted signal with a user separated signal to generate a correlated signal.

14. The apparatus of claim 13, wherein the CP frequency offset estimator frequency time averages the correlated signal to generate the CP frequency offset estimate.

15. The apparatus of claim 14, wherein the offset combiner combines the DMRS frequency offset estimate ($\Phi$fine) with the frequency offset estimate ($\Phi$coarse) to determine a total phase difference $\Phi$total from an equation expressed as: $\Phi$total=$\Phi$fine+$\Phi$coarse.

16. An apparatus, comprising:
- a demodulation reference signal (DMRS) estimator configured to determine a DMRS frequency offset estimate in accordance with DMRS symbols in a received signal;
- a cyclic prefix (CP) estimator coupled to the DMRS estimator and configured to provide a CP frequency offset estimate in response to cyclic prefix values associated with symbols received in the received signal, wherein the CP estimator is able to adjust a time offset of the received signal and wherein the CP estimator is configured to separate a selected user's uplink transmission from the time adjusted received signal to generate a separated signal; and
- a circuit coupled to the CP estimator and configured to combine the DMRS frequency offset estimate with the CP frequency offset estimate to identify a combined frequency offset estimate.

17. The apparatus of claim 16, wherein the DMRS estimator is configured to separate a selected user's uplink transmission associated with the DMRS symbols from the received signal.

18. The apparatus of claim 16, wherein the DMRS estimator is configured to calculate a phase difference $\Phi$ between two DMRS symbols.

19. The apparatus of claim 18, wherein the DMRS estimator is configured to divide the phase difference $\Phi$ by a selected time interval T to determine the DMRS frequency offset estimate.

* * * * *